Nov. 16, 1937.  R. W. DAVIS  2,098,945
WIRE SPLICER
Filed July 3, 1936  2 Sheets-Sheet 1
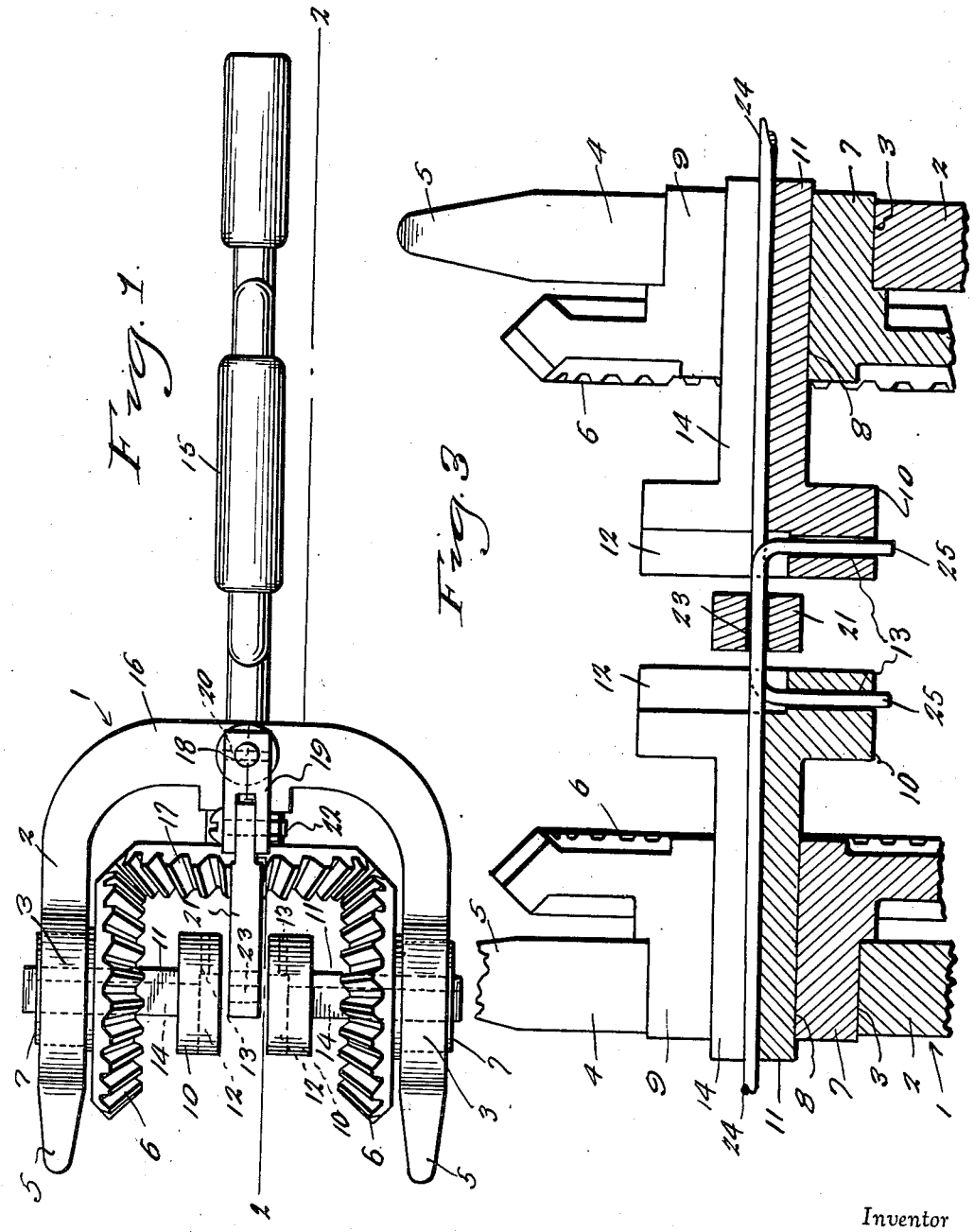
Inventor
Robert W. Davis
By Clarence A. O'Brien and
Hyman Berman Attorney

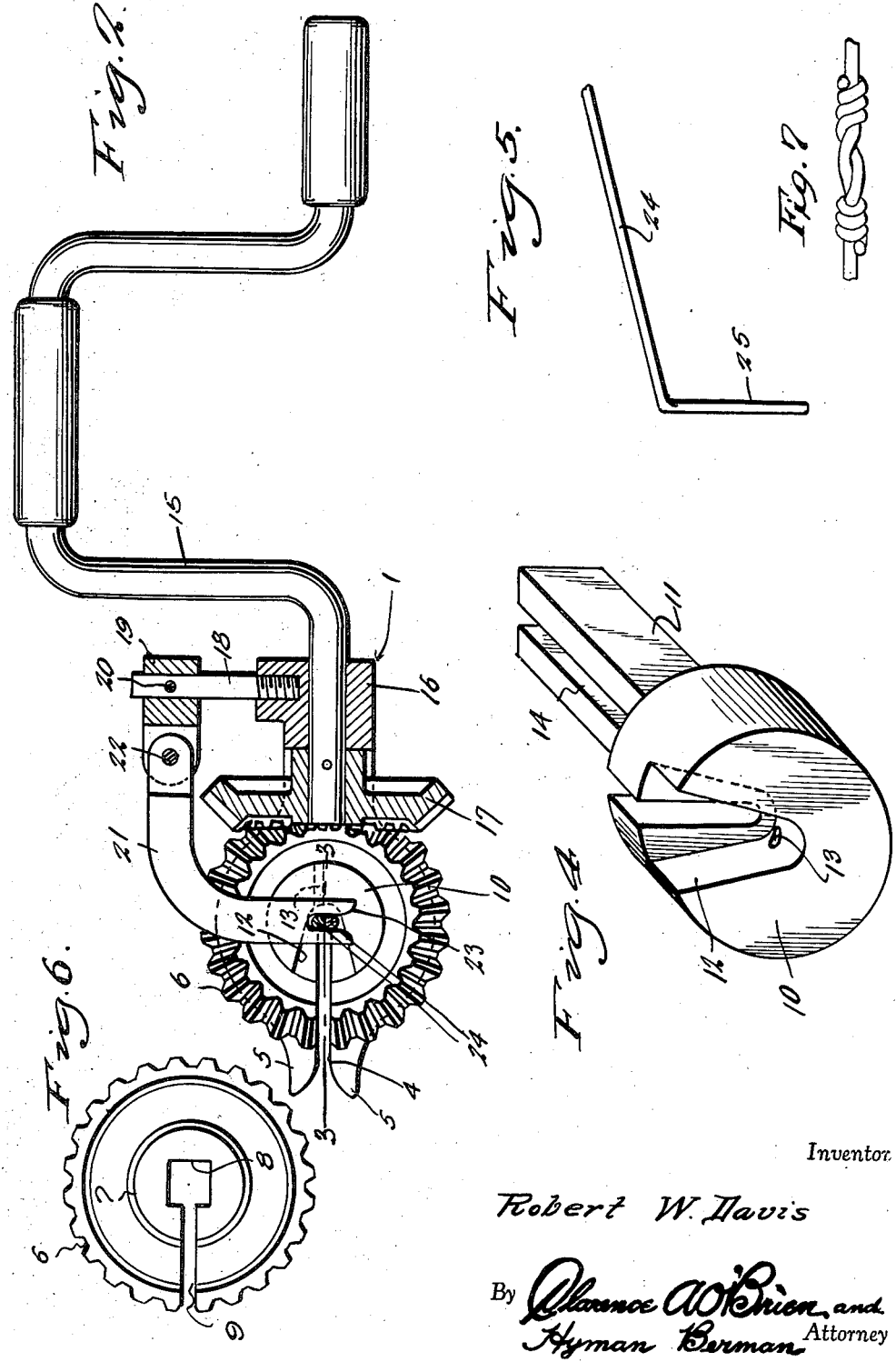

Patented Nov. 16, 1937

2,098,945

UNITED STATES PATENT OFFICE 2,098,945

WIRE SPLICER

Robert W. Davis, Lexington, Ky.

Application July 3, 1936, Serial No. 88,901

1 Claim. (Cl. 140—115)

The present invention relates to new and useful improvements in wire splicers for use particularly in fence building for joining woven wire, although it will be understood that the device may be used for any other purpose for which it may be found adapted.

An important object of the invention is to provide a portable, hand operated splicing machine of the aforementioned character embodying a novel construction, combination and arrangement of parts through the medium of which the wires to be spliced may be expeditiously inserted.

Another important object of the invention is to provide a machine of the aforementioned character which will automatically adjust itself as the splice is formed.

Other objects of the invention are to provide a wire splicing machine of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a top plan view of a wire splicer constructed in accordance with the present invention.

Figure 2 is a view in vertical longitudinal section, taken substantially on the line 2—2 of Figure 1.

Figure 3 is a fragmentary view in horizontal section, taken substantially on the line 3—3 of Figure 2.

Figure 4 is a detail view in perspective of one of the twister heads.

Figure 5 is a perspective view of an end portion of one of the wires to be spliced.

Figure 6 is a view in end elevation of one of the twisting gears.

Figure 7 is a perspective view of the tie.

Referring now to the drawings in detail, it will be seen that the embodiment of the invention which has been illustrated comprises a substantially U-shaped metallic frame 1 the legs 2 of which are formed to provide bearings 3. Of course, the bearings 3 are transversely aligned. Outwardly or forwardly of the bearings 3 the legs 2 of the frame 1 have formed horizontally therein slots 4 for the reception of the wires to be spliced. At their free ends, the legs 2 of the substantially U-shaped frame 1 terminate in guides 5 which facilitate the insertion of the wires in the slots 4.

The reference numeral 6 designates opposed beveled gears which are mounted in the frame 1, said gears including outwardly projecting hub portions 7 which are journaled in the bearings 3. Extending through the hub portions 7 of the gears 6 are polygonal bores 8 with which radial slots 9 communicate, said slots 9 splitting said gears 6 and the hub portions 7.

The reference numeral 10 designates circular twister heads from the outer ends of which integral shanks 11 of polygonal cross section project, said shanks 11 being slidably engaged in the bores of the gears 6. Substantially V-shaped recesses 12 are formed in the inner end portions of the twister heads 10. Openings 13 in the twister heads 10 communicate with the inner portions of the recesses 12. Also communicating with the recesses 12 are grooves 14 which extend longitudinally through the shanks 11 and the inner portions of the heads 10.

The reference numeral 15 designates a hand crank which is journaled in the bight portion 16 of the substantially U-shaped frame 1. Fixed on the forward end portion of the hand crank 15 and operable in the frame 1 is a beveled gear 17 which is in mesh with the gears 6.

Threadedly mounted in the bight portion 16 of the frame 1 and rising therefrom is a post 18. A bracket 19 is secured on the post 18 in any suitable manner, as by a pin 20. The reference numeral 21 designates an angular holder which is pivotally mounted, as at 22, on the bracket 19. The free end portion of the holder 21 is provided with a slot 23 for the reception of the wires 24 to be spliced. The holder 21 is adapted to engage the wires between the twister heads 10.

It is thought that the operation of the device will be readily apparent from a consideration of the foregoing. The construction and arrangement is such that when the substantially U-shaped portion of the handle 15 is in vertical position and parallel with the post 18, as seen in Figures 1 and 2 of the drawings, the slots 9, the grooves 14 and the recesses 12 are aligned and communicate with the slots 4. With the holder 21 swung upwardly to inoperative position, the wires to be spliced may now be inserted, the inner end portions of said wires first being bent at right angles as at 25. These end portions 25 of the wires are inserted in the openings 13 of the twister heads 10. The arrangement of these openings 13 in the twister heads 10 is such that the inner end portions of the wires 24 are disposed one above the other, as seen in Figure 2 of the drawings. The holder 21 is now swung downwardly to engage the overlapping inner end portions of the wires 24 in the slot 23 and the device is now ready to function. By rotating the crank handle 15 the gears 6 are driven in opposite directions by the gear 17 and, with the holder 21 retaining the wires against rotation, the angularly projecting end portions 25 of one of said wires is twisted around the other of said wires by the heads 10. As the splice illustrated in Figure 7 lengthens or progresses the heads 10 slide outwardly in the gears 6. After the splice has been made the various grooves, slots, recesses, etc. are again brought into alignment and the holder 21 is raised after which the machine may be conveniently disengaged from the wire.

It is believed that the many advantages of a wire splicer constructed in accordance with the present invention will be readily understood, and although a preferred embodiment of the machine is as illustrated and described, it is to be understood that changes in the details of construction and in the combination and arrangement of parts may be resorted to which will fall within the scope of the invention as claimed.

What is claimed is:—

A wire splicing machine of the class described comprising a substantially U-shaped frame, bearings on the legs of said frame, said legs of said frame having horizontal slots therein extending from the bearings to the free ends thereof, said slots being for the insertion of wires to be twisted, a pair of opposed gears rotatably mounted in the frame and including elongated hubs journaled in the bearings, said gears and hubs having radial slots therein for registry with the first-named slots for receiving the wires therefrom, said hubs further having polygonal bores extending therethrough and communicating with the second-named slots, a pair of spaced, opposed twister heads mounted in the frame and including outwardly projecting shanks of polygonal cross section slidably engaged in the bores, said twister heads having substantially V-shaped recesses in their inner end portions and further having openings therein communicating with the inner portions of said recesses, said heads and the shanks further having grooves therein communicating with the recesses and adapted to communicate with the second-named slots, said grooves, recesses and the openings for the reception of the wires, a crank handle journaled in the bight portion of the frame, a gear fixed on said crank handle and engaged with the first-named gears for actuating the same in opposite directions, a post mounted on the frame, a bracket mounted on said post, and an angular holder pivotally mounted on the bracket and engageable with the wires between the twister heads for securing said wires against rotation.

ROBERT W. DAVIS.